(12) United States Patent
Xu et al.

(10) Patent No.: US 7,948,948 B2
(45) Date of Patent: May 24, 2011

(54) BASE BAND PROCESSING MODULE N+M BACKUP METHOD BASED ON SWITCHING AND DEVICE THEREOF

(75) Inventors: Junwen Xu, Guangdong (CN); Zhengrong Lai, Guangdong (CN); Zhonglei Shao, Guangdong (CN)

(73) Assignee: ZTE Corporation, Shenzhen, Guangdong (CN)

( * ) Notice: Subject to any disclaimer, the term of this patent is extended or adjusted under 35 U.S.C. 154(b) by 977 days.

(21) Appl. No.: 11/722,377

(22) PCT Filed: Dec. 21, 2004

(86) PCT No.: PCT/CN2004/001485
§ 371 (c)(1),
(2), (4) Date: Jun. 21, 2007

(87) PCT Pub. No.: WO2006/066449
PCT Pub. Date: Jun. 29, 2006

(65) Prior Publication Data
US 2010/0016021 A1    Jan. 21, 2010

(51) Int. Cl.
*H04W 4/00* (2009.01)

(52) U.S. Cl. ........ 370/331; 370/310; 370/328; 370/329; 455/73; 455/560; 714/10; 714/11; 714/12; 714/13; 375/219

(58) Field of Classification Search .................. 370/310, 370/328, 329, 331; 455/73, 560; 714/9–13; 375/219
See application file for complete search history.

(56) References Cited

U.S. PATENT DOCUMENTS

| | | | | |
|---|---|---|---|---|
| 6,058,317 A * | 5/2000 | Posti | ............................. | 455/561 |
| 2004/0001479 A1 * | 1/2004 | Pounds et al. | ................. | 370/352 |
| 2004/0185907 A1 * | 9/2004 | Lange | ........................... | 455/561 |
| 2004/0264457 A1 * | 12/2004 | Benayoun et al. | ............ | 370/389 |
| 2005/0223276 A1 * | 10/2005 | Moller et al. | ................... | 714/13 |

FOREIGN PATENT DOCUMENTS

| | | |
|---|---|---|
| CN | 1176728 | 3/1998 |
| CN | 1346219 | 4/2002 |
| CN | 1459153 | 11/2003 |
| EP | 1 450 572 A1 | 8/2004 |
| JP | 2001-196976 A | 7/2001 |
| KR | 2003-0094972 A | 12/2003 |
| KR | 1020040077085 A | 9/2004 |
| WO | 96/27269 A1 | 9/1996 |

OTHER PUBLICATIONS

European Search Report: EP 04 80 2498.

* cited by examiner

*Primary Examiner* — Pankaj Kumar
*Assistant Examiner* — Gautam Sharma
(74) *Attorney, Agent, or Firm* — Ladas & Parry LLP

(57) ABSTRACT

The present invention discloses a base band processing module N+M backup method based on switch, is characterized in that: a switch unit is added between RF transceiver unit and base band processing unit, and IQ signal forwarding between base band processing modules of the base band processing unit and RF transceiver modules of the RF transceiver unit is performed by the switch unit; handing over the functions of the base band processing module in trouble to a backup base band processing module by resetting the switch unit and modifying the path of receiving and transmitting IQ signal, therefore realizing the N+M backup for base band processing module. The present invention can effectively realize the N+M backup for the base band processing module by adding a switch unit, therefore solving the technical problem of complexity and high cost for wiring and interfacing when having a large number of BBP and TRX modules.

8 Claims, 4 Drawing Sheets

BASE BAND PROCESSING MODULE N+M BACKUP METHOD BASED ON SWITCHING AND DEVICE THEREOF

TECHNICAL FIELD

The present invention relates to a mobile communication system, especially to a base band processing module N+M backup method and a device thereof in a base station subsystem.

BACKGROUND ART

Currently, mobile communication techniques have been widely used in various fields as well as in people's life. Mobile communication system is a communication system in which lots of information transmissions can be established between mobile objects, and between mobile objects and stationary users. The devices on network terminal of a mobile communication system mainly include a base station, a base station controller and core network equipments. The base station mainly consists of a transmission unit, a common control unit, a clock unit, a RF (Radio Frequency) transceiver unit and a base band processing unit. There are no strict standards for interface between the RF transceiver unit and the base band processing unit, and generally, an internal interface is adopted.

In a base station communication system, uplink direction refers to the flow direction of signals transmitted from a mobile telephone and received by the base station, and downlink direction is from the base station to the mobile telephone. In the uplink direction, the received RF signals are performed down conversion and analogue-to-digital conversion by the RF transceiver unit, then are converted into digital signals, and are transmitted to the base band processing unit for operations like demodulating, de-interleaving and channel decoding. In the downlink direction, after being channel coded, interleaved and modulated in the base band processing unit, the digital signals are transmitted to the RF transceiver unit to be performed digital-to-analogue conversion and up conversion. There are digital signal interfaces in both uplink and downlink directions between the RF transceiver unit and the base band processing unit.

The RE transceiver unit and base band processing unit of the base station generally consist of several modules, and usually several base band processing modules are needed to jointly complete the base band processing of one or more RF transceiver modules. In fact, each base band processing module completes the base band processing of several carrier frequencies. Therefore, in uplink direction, it is necessary to transmit signals outputted by one or more RF transceiver modules (TRX) to several base band processing modules (BBP), while in downlink direction, signals outputted by each base band processing module (BBP) are transmitted to the corresponding RF transceiver module (TRX).

The existing method for base band processing module N+M backup is shown as FIG. 1, wherein each base band processing module (BBP) 111 and each RF transceiver module 121 are connected in a meshwork. The features of this method are: 1. in uplink direction, digital signals outputted by each RF transceiver module (TRX) 121 need to be transmitted to all the base band processing modules (BBP) 111; 2. in downlink direction, digital signals outputted by each base band processing module 111 need to be transmitted to all the RF transceiver modules 121; and 3. each BBP 111 or TRX 121 selects signals needing to be processed according to configuration.

This method also has the following disadvantages:
1. the method becomes impracticable when there are a large number of BBP and TRX modules;
2. there are lots of wirings in backplane;
3. the interfaces in BBP and TRX modules are complex;
4. when the BBP and TRX need to be in two or more plugged boxes, there will be a large amount of cables between the plugged boxes, resulting in a poor reliability; and
5. when N>5, the cost will be high.

SUMMARY OF THE INVENTION

The present invention offers a base band processing module N+M backup method based on switch and a device thereof to overcome the technical problem of the existing method that the wiring and interface are complex and the cost is high when there are a large number of BBP and TRX modules.

In order to achieve the above purpose, the present invention offers a base band processing module N+M backup method based on switch, which is characterized in that: a switch unit is added between a RF transceiver unit and a base band processing unit, the IQ signal forwarding between base band processing modules of the base band processing unit and RF transceiver modules of the RF transceiver unit is performed by the switch unit, and the functions of the base band processing module in trouble are handed over to a backup base band processing module by resetting the switch unit and modifying the path of receiving and transmitting IQ signals, therefore realizing N+M backup for the base band processing module.

The above-mentioned base band processing module N+M backup method based on switch is characterized in that: in downlink direction, the switch unit hands over the IQ signals outputted by the base band processing module to the designated RF transceiver module; and in uplink direction, the switch unit hands over the IQ signals outputted by the RF transceiver module to the designated base band processing module.

The above-mentioned base band processing module N+M backup method based on switch is characterized in that: when the base band processing module gets out of order, the output of the RF transceiver module which is processed by the malfunctioned base band processing module will be handed over to the backup base band processing module through resetting the switch unit, meanwhile, the output of the backup base band processing module will be handed over to the RF transceiver module.

The above-mentioned base band processing module N+M backup method based on switch is characterized in that: the switch unit consists of two switch modules, either of which can accomplish the IQ signal forwarding and path handover independently, with one of the switch modules being the main module and the other being the spare module; The main switch module and spare switch module can be interconverted.

The above-mentioned base band processing module N+M backup method based on switch is characterized in that: a RF transceiver unit, a base band processing unit and a switch unit are taken as one group, and different groups are interconnected through switch modules of the switch unit; when the base band processing module of one group is in trouble, its functions can be handed over to the backup base band processing module of another group by resetting the switch module.

In order to better realize the above purpose, the present invention also offers a device for base band processing module N+M backup based on switch, which is characterized in that: the device comprises a RF transceiver unit, a base band processing unit and a switch unit; the switch unit connects with all the base band processing modules of the base band processing unit and all the RF transceiver modules of the RF transceiver unit via bidirectional data interfaces; IQ signal forwarding between the base band processing modules of the base band processing unit and the RF transceiver modules of the RF transceiver unit is performed by the switch unit; the functions of the malfunctioned base band processing module are handed over to a backup base band processing module by resetting the switch unit and modifying the path of receiving and transmitting IQ signals, therefore realizing the N+M backup for the base band processing modules.

The above-mentioned base band processing module N+M backup device based on switch is characterized in that: said switch unit consists of two switch modules, each connects with all the base band processing modules of the base band processing unit and all the RF transceiver modules of the RF transceiver unit via bidirectional data interfaces, thereby forming two star topology signal transmission networks; either switch module is able to forward the IQ signals and hand over the paths thereof independently, with one switch module being the main module and the other being the spare module; said main switch module and spare switch module can be interconverted.

The above-mentioned base band processing module N+M backup device based on switch is characterized in that: a RF transceiver unit, a base band processing unit and a switch unit are taken as one group, and switch units between different groups are interconnected via bidirectional data interfaces; when the base band processing module of one group is in trouble, its functions can be handed over to the backup base band processing module in another group by resetting the switch module.

Compared with the prior art, the present invention has the following advantages:

1. it is more practical when there are a large number of BBP and TRX modules;
2. the interfaces in the BBP and TRX modules are simpler;
3. when the BBP and TRX modules need to be in two or more plugged boxes, there will be fewer cables between plugged boxes, thereby achieving a better reliability; and
4. when N>5, the cost will be lower than that of the prior method.

PREFERRED EMBODIMENT OF THE INVENTION

The implementation of the present invention will be described in detail with reference to the drawings.

Figure 1:
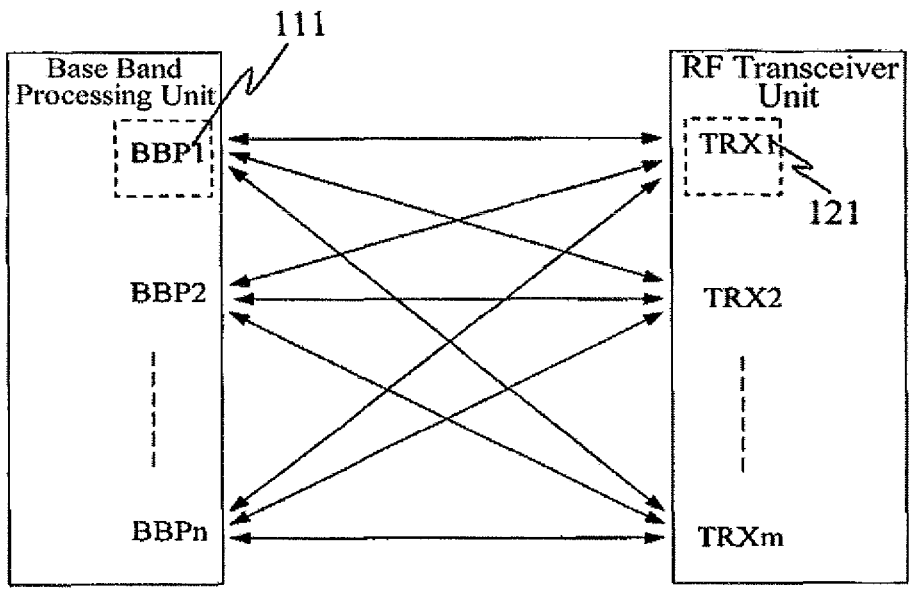
FIG. 1 is a schematic view of the embodiment of the prior art.

FIG. 1 is a schematic view of the embodiment of the prior art, wherein the base band processing modules and all the RF transceiver modules are connected via bidirectional data interfaces. However, the wiring between the base band processing modules and RF transceiver modules is complex, thus it is hard to implement when there are a lot of RF transceiver modules or base band processing modules.

Figure 2:
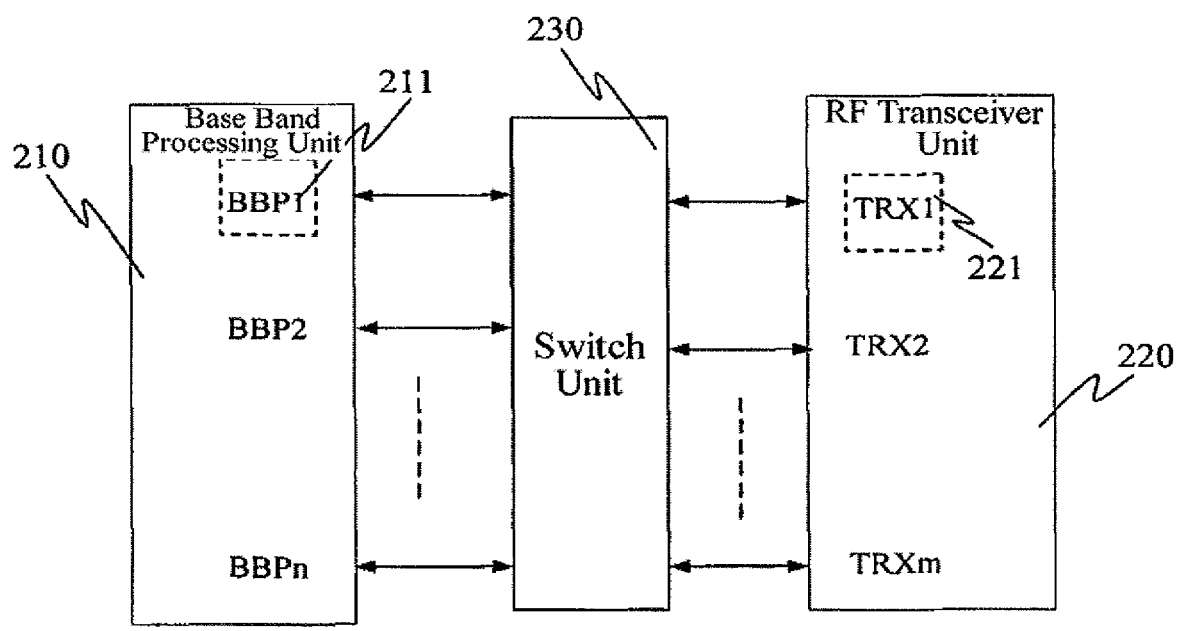
FIG. 2 is a schematic view of the embodiment of the present invention.

FIG. 2 is a schematic view of the embodiment of the present invention. The technical scheme of the present invention can achieved by adding a switch unit 230 between RF transceiver unit 210 and base band processing unit 220. There are bidirectional data interfaces between the switch unit 230 and all the base band processing modules 211, as well as between the switch unit 230 and all the RF transceiver modules 221. The Base band processing module (BBP) 211 is mainly for processing one or more carrier IQ signals. The RF transceiver module (TRX) 221 is for performing the switch between several carrier IQ signals and RF signals. The switch unit 230 is mainly for forwarding the IQ signals.

Figure 5:
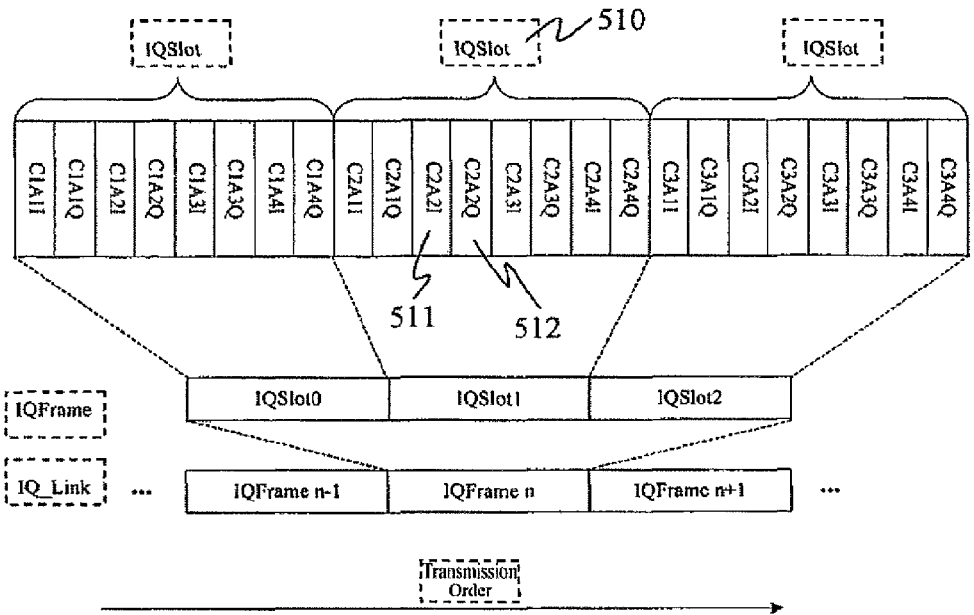
FIG. 5 is a schematic view of time slots in an IQ link.

One IQ link can be separated into several IQ time slots according to needs. Each time slot may consist of IQ data of several antennae of one or more carriers. FIG. 5 is a schematic view of an IQ link having three time slots, each of which consists of the IQ data of four antennae of one carrier, for example, in time slot 510, data 501 with the number C2A2I represents I data of two antennae of two carriers (C represents carrier and A represents antenna), data 502 with the number C2A2Q represents Q data of two antennae of two carriers. The basic unit that the switch unit switches is IQ time slot, and the switch unit can switch any IQ time slot in any input link to any other IQ time slot in any input link.

Figure 6:
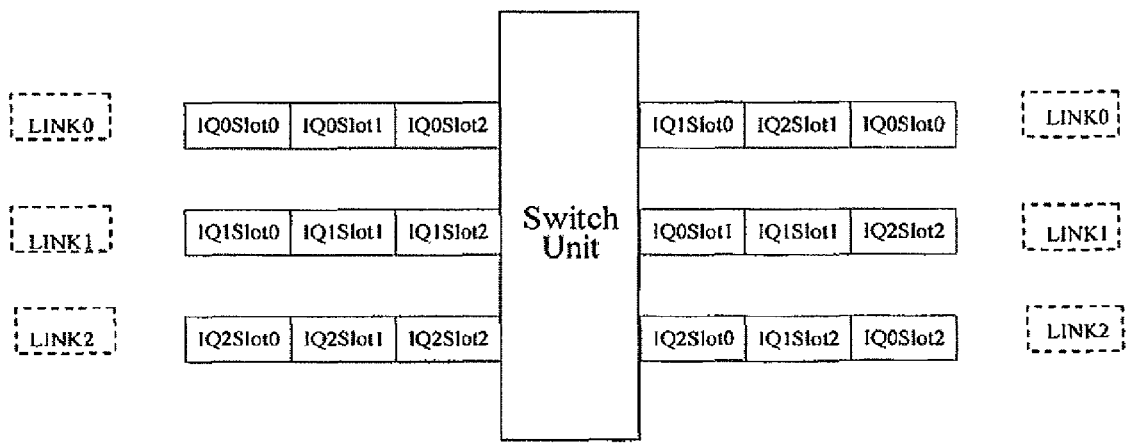
FIG. 6 is a schematic view of IQ time slot switch of the present invention.

FIG. 6 is a schematic view of IQ time slot switching of the present invention, wherein there are three input links and three output links, with each link having three IQ time slots; IQ time slot 0 of the input link 0 is switched to IQ time slot 2 of the output link 0, IQ time slot 1 of the input link 0 is switched to IQ time slot 0 of the output link 1, IQ time slot 2 of the input link 0 is switched to IQ time slot 2 of the output link 2, and so on.

Figure 7:
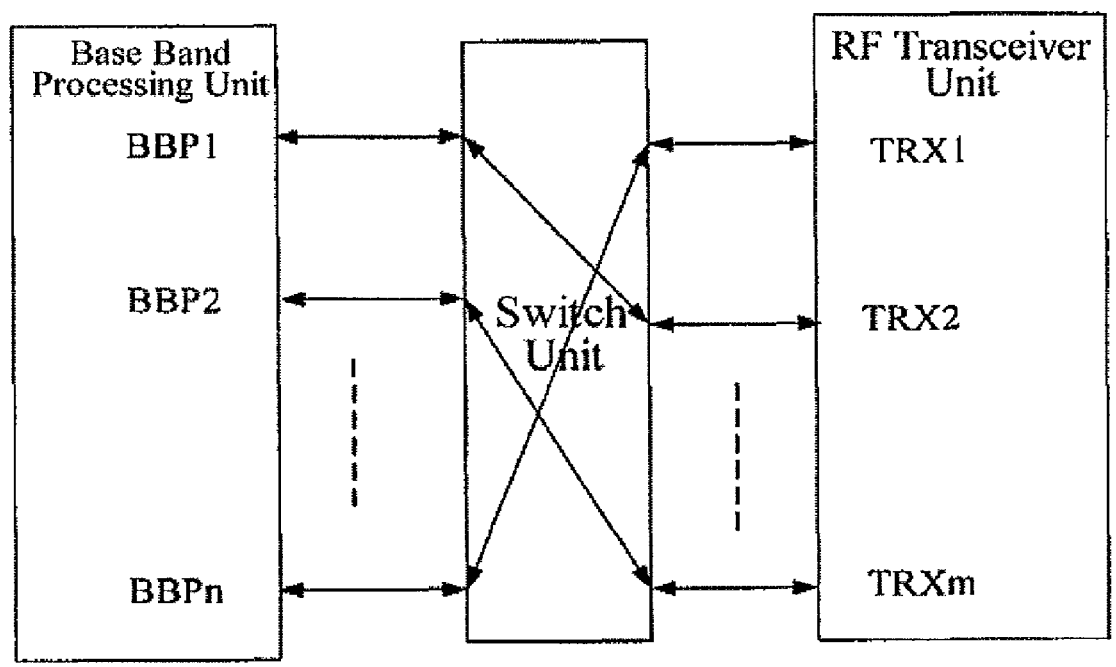
FIG. 7 is a schematic view of wiring switch.

The wiring switch, as shown in FIG. 7, can only be performed between IQ links. It is a special case of the IQ time slot switch, where one IQ link has only one IQ time slot. The IQ time slot switch can provide more flexibility than the wiring switch. For example, in TD-SCDMA (Time Division-Synchronous Code Division Multiple Access), a RF transceiver module can process 6 carriers with 4 antennae, while a base band processing module can process 3 carriers with 8 antennae, thus, in the 8-antennae system, if data of 4 antennae of 3 carriers constitutes an IQ time slot, the base band processing module N+M backup can be realized conveniently through the switch unit.

Figure 3:
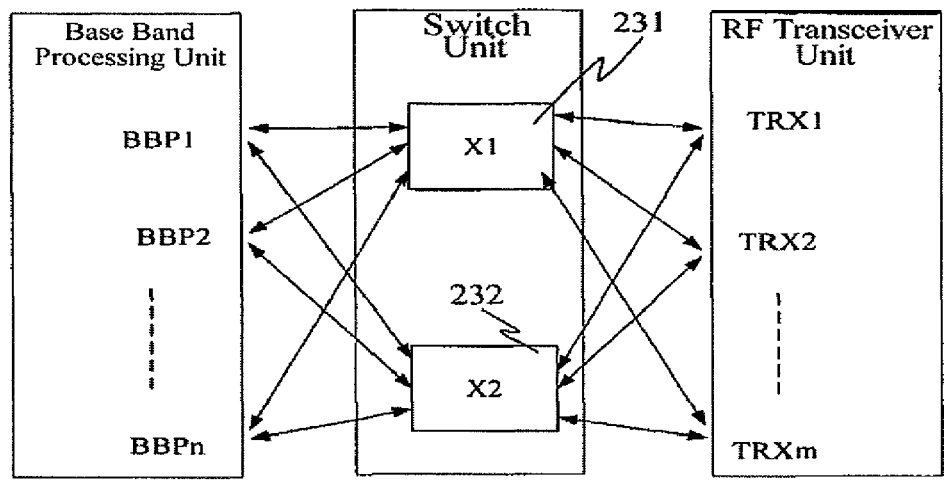
FIG. 3 is a schematic view of embodiment 1 of the present invention.

FIG. 3 is a schematic view of embodiment 1 of the present invention. The switch unit consists of two switch modules 231 (X1) and 232 (X2), making up two star topology signal transmission networks (dual-star topology networks). The switch modules X1 and X2 are the r centers of the two star topology networks. X1 and X2 are backups for each other. X1 is supposed to be the main switch module. There are bidirectional data interfaces between X1 and X2 and each base band processing module, and between X1 and X2 and each RF transceiver module.

In downlink direction, the IQ signals outputted by the base band processing modules are transmitted to X1, and X1 forwards the IQ signals to the designated RF transceiver module according to the configuration. In uplink direction, the IQ signals outputted by the RF transceiver modules are transmitted to X1, and X1 forwards the IQ signals to the designated base band processing module according to the configuration.

X2 and X1 have equivalent functions and are backups for each other. When X1 is in trouble, the base band processing module will accomplish the process described above through X2, and all the work to be performed by X1 will be transferred to X2.

When anyone of the base band processing modules BBP1, BBP2 ..., BBPn−1 breaks down, base band processing module BBPn will substitute the malfunctioned module, and the base band processing module backup can be easily realized only by the system giving the command of modifying the configuration of X1. For example, supposing the IQ data outputted by BBP2 is switched to RF transceiver module TRX3 via X1, and in uplink direction, the IQ data processed by BBP2 come from RF transceiver module TRX3, then when base band processing module BBP2 breaks down, it only needs to replace the base band processing module BBP2 with the base band processing module BBPn and modify the configuration of X1. Thus, in uplink direction, the switch from the RF transceiver module TRX3 to the base band processing module BBP2 is changed to the switch from the RF transceiver module TRX3 to the base band processing module BBPn; in downlink direction, the switch from the base band processing module BBP2 to the RF transceiver module TRX3 is changed to the switch from the base band processing module BBPn to the RF transceiver module TRX3, and all the work of the BBP2 module will be performed by the base band processing module BBPn, thereby realizing the base band processing module backup.

Figure 4:
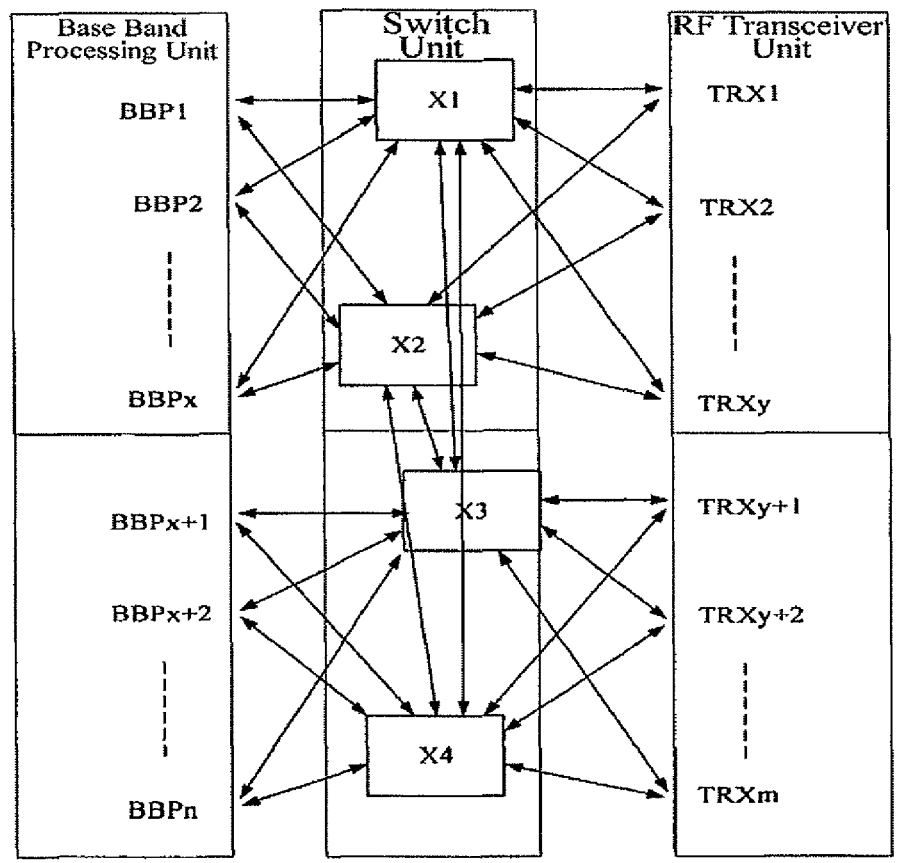
FIG. 4 is a schematic view of embodiment 2 of the present invention.

FIG. 4 is a schematic view of embodiment 2 of the present invention. The base band processing modules, RF transceiver modules and switch modules are separated into two groups. The switch unit is composed of X1, X2 and X3, X4. X1 and X2 are backups for each other, and they form a switch module. X3 and X4 are backups for each other, and they form another switch module. In this embodiment, X1 and X3 are supposed to be the main modules. Between two groups, bidirectional data interfaces only exist between switch modules. Within a same group, there are bidirectional data interfaces between the switch module and all the base band processing modules, and between the switch module and all the RF transceiver modules.

When anyone of the base band processing modules BBP1, BBP2 ..., BBPn−1 breaks down, base band processing module BBPn will replace the malfunctioned one, and the base band processing module backup can be easily realized only by the system giving the command of modifying the configurations of X1 and X3. For example, supposing the IQ data outputted by BBP2 is switched to the RF transceiver module TRX3 via X1, and the IQ data processed by BBP2 in uplink direction come from the RF transceiver module TRX3, then when the base band processing module BBP2 breaks down, it only needs to replace the base band processing module BBP2 with the base band processing module BBPn and modify the configurations of X1 and X3. Thus, in uplink direction, the switch from the RF transceiver module TRX3 to the base band processing module BBP2 is changed to the switch from the RF transceiver module TRX3 to the base band processing module BBPn; in downlink direction, the switch from the base band processing module BBP2 to the RF transceiver module TRX3 is changed to the switch from the base band processing module BBPn to the RF transceiver module TRX3, and all the work of BBP2 module will be performed by the base band processing module BBPn, thereby realizing the base band processing module backup.

When there are even more base band processing modules and RF transceiver modules, the base band processing modules and the RF transceiver modules can be separated into more groups, and each group will be added with a switch module. Anyway, M additional base band processing modules can be used to effectively realize the N+M backup for all the base band processing modules.

From the above, the present invention discloses a method for effectively realizing base band processing module N+M backup through adding a switch unit and a device thereof, which are able to reduce system cost and improve system reliability.

The above description only illustrates the preferred embodiments of the present invention, and should not be regarded as limitation to the scope of the present invention. All the equivalent variations and modifications made according to the present invention should be covered within the protection scope of the present invention.

INDUSTRIAL APPLICABILITY

The present invention resolves the technical problem of complex and expensive wiring and interface in the case of a large number of BBP and TRX modules. By adding a switch unit, the N+M backup for the base band processing modules can be realized effectively. This invention simplifies the interfaces between the BBP and TRX modules; decreases the cables between plugged boxes when BBP and TRX need to be in two or more plugged boxes; reduces the system cost and improves the system reliability. The present invention can be applied to the base station subsystem in a mobile communication system, as well as any field suffering from the similar technical problem. It can also be widely used in fields of industrial automation, monitoring and communication etc.

What we claim is:

1. A base band processing module N+M backup method based on switch, wherein
a switch unit is added between a RF transceiver unit and a base band processing unit, said switch unit performs IQ signal transferring between base band processing modules of the base band processing unit and RF transceiver modules of the RF transceiver unit; and
functions of a base band processing module in trouble are handed over to a backup base band processing module by resetting said switch unit and modifying the path of receiving and transmitting the IQ signals, therefore realizing the base band processing module N+M backup.

2. The base band processing module N+M backup method based on switch according to claim 1, wherein, in downlink direction, the IQ signals outputted by the base band processing t module are transferred to the RF transceiver module designated via the switch unit; in uplink direction, the IQ signals outputted by the RF transceiver module are transferred to the base band processing module designated via the switch unit.

3. The base band processing module N+M backup method based on switch according to claim 2, wherein, when a base band processing module breaks down, the output of the RF transceiver module being processed by the malfunctioned base band processing module will be handed over to the backup base band processing module by resetting the switch unit, and at the same time, output of the backup base band processing module will be switched to the RE transceiver module.

4. The base band processing module N+M backup method based on switch according to claim 3, wherein, said switch unit consists of two switch modules, either of which is able to accomplish the IQ signal transferring and handover of paths thereof independently; one of the switch modules is a main module and the other is a spare module; said main switch module and spare switch module can be interconverted.

5. The base band processing module N+M backup method based on switch according to claim 4, wherein, a RF transceiver unit, a base band processing unit and a switch unit are taken as one group, and different groups are connected in a bidirectional pattern through switch modules of the switch unit; functions of the base band processing module that breaks down can be handed over to the backup base band processing module of another group by resetting the switch module.

6. A base band processing module N+M backup device based on switch, comprising a RF transceiver unit, a base band processing unit and a switch unit; wherein the switch unit connects with all base band processing modules of the base band processing unit and all RF transceiver modules of the RF transceiver unit via bidirectional data interfaces; said switch unit performs IQ signal transferring between the base band processing modules of the base band processing unit and the RF transceiver modules of the RF transceiver unit; functions of the base band processing module that breaks down are handed over to a backup base band processing module by resetting said switch unit and modifying paths of receiving and transmitting the IQ signals, therefore realizing base band processing module N+M backup.

7. The base band processing module N+M backup device based on switch according to claim 6, wherein, said switch unit consists of two switch modules, either of which connects with all the base band processing modules of the base band processing unit and all the RF transceiver modules of the RF transceiver unit via bidirectional data interfaces, as such two star topology signal transmission networks are formed; either switch module is able to accomplish IQ signal transferring and handover of paths thereof independently; one of the switch modules is a main module and the other is a spare module; said main switch module and spare switch module can be interconverted.

8. The base band processing module N+M backup device based on switch according to claim 7, wherein, a RF transceiver unit, a base band processing unit and a switch unit are taken as one group, and switch units of different groups are connected via bidirectional data interfaces in a bidirectional pattern; functions of the base band processing module that breaks down in one group are handed over to the backup base band processing module of another group by resetting the switch module.

\* \* \* \* \*